July 12, 1949.  L. R. MOORE ET AL  2,475,850
FLOW RESPONSIVE ELECTRIC CIRCUIT CONTROLLING DEVICE
Filed Feb. 20, 1948
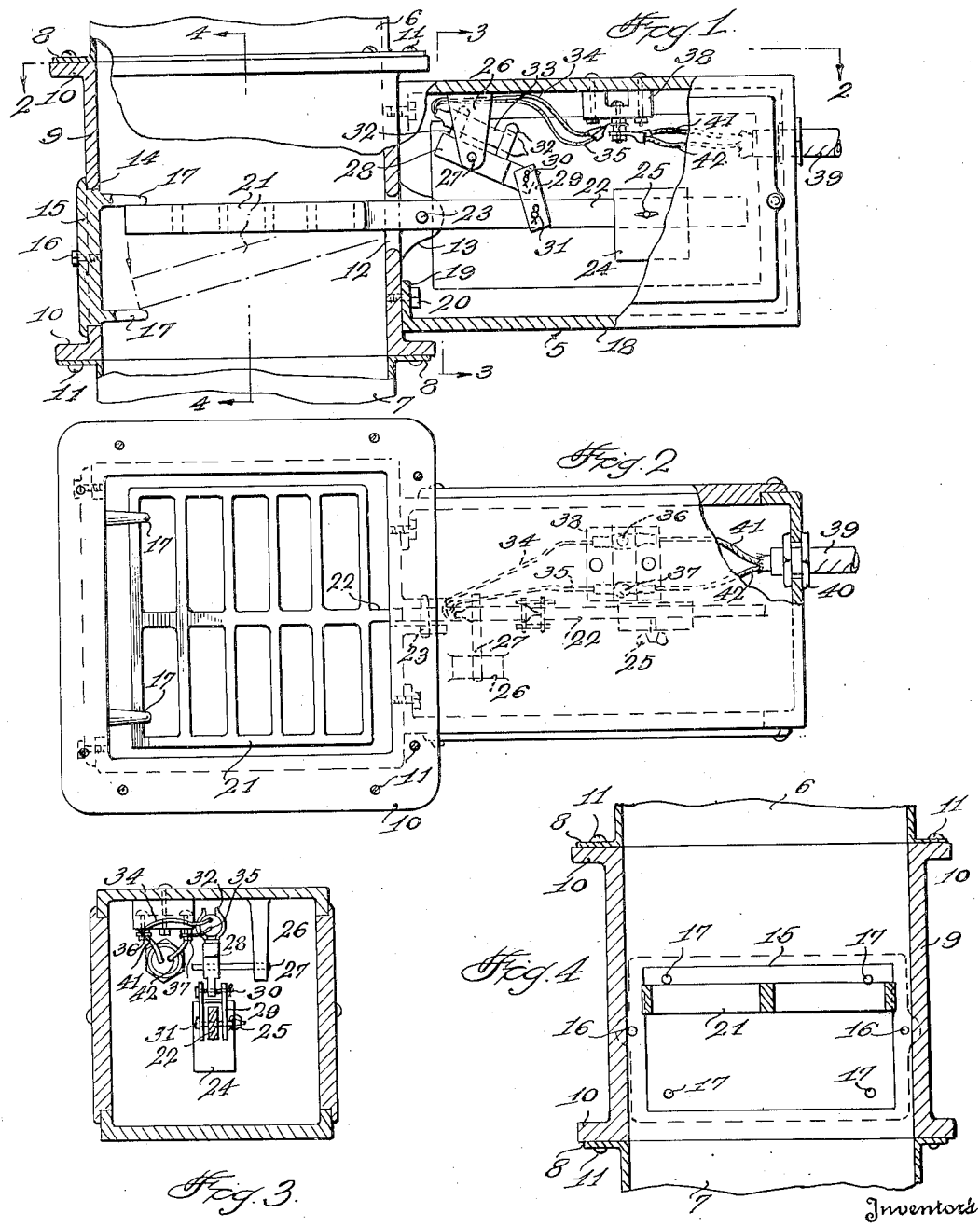
Inventors
*Lon R. Moore &
Keith B. Mitchell*
By *John N. Randolph*
ATTORNEY Patented July 12, 1949

2,475,850

UNITED STATES PATENT OFFICE 2,475,850

FLOW RESPONSIVE ELECTRIC CIRCUIT CONTROLLING DEVICE

Lon R. Moore and Keith B. Mitchell,
Wichita, Kans.

Application February 20, 1948, Serial No. 9,846

3 Claims. (Cl. 200—52)

This invention relates to a device primarily intended for use in flour mills but which is readily adaptable for use in other industries for controlling and regulating the mixture of two substances.

In the manufacture of flour to obtain best results the wheat must have a moisture content of approximately 15% which ordinarily necessitates the addition of water to the wheat to obtain the required moisture content. It frequently occurs that the grain, bran or shorts is flooded in the mill as a result of a failure to manually turn off the water supply after the operation of running the grain into the pit has been completed and it is accordingly a primary object of the present invention to provide an automatic control device for the regulation of the electric circuit and by means of which the flow of water will automatically shut off when the running of the grain ceases and will be automatically resumed upon recommencement of the grain flow.

Various other objects and advantages of the invention will hereinafter become more fully apparent from the following description of the drawing, illustrating a presently preferred embodiment thereof, and wherein:

Figure 1 is a side elevational view partly in vertical section showing the invention in an applied position;

Figure 2 is a top plan view, partly broken away of the invention taken substantially along a plane as indicated by the line 2—2 of Figure 1; and Figures 3 and 4 are cross sectional view taken substantially along planes as indicated by the lines 3—3 and 4—4, respectively, of Figure 1.

Referring more specifically to the drawing, for the purpose of illustrating a preferred application and use of the flow responsive switch actuator, comprising the invention and designated generally 5, spaced portions or sections of a grain spout are indicated at 6 and 7. The spaced grain spout sections 6 and 7 are provided with adjacent flanged ends 8 for reception therebetween of a conduit section 9 forming a part of the invention and which is provided with flanged ends 10 which abut against the flanges 8 and are secured thereto by fastenings 11.

The conduit section 9 is substantially rectangular in cross section, as best seen in Figure 2, and is provided with a vertically elongated opening 12 in one side wall thereof and is provided with laterally spaced outwardly projecting ears 13 which are disposed, one on either side of the opening 12. The opposite side wall of the conduit section 9 is provided with an opening 14 which is normally closed by a flanged insert 15 and which is detachably retained in applied position by fastenings 16. The insert 15, adjacent its top and bottom edges, is provided with inwardly projecting studs 17 forming limiting stops for a purpose which will hereinafter become apparent.

A casing 18 is provided with an inwardly flanged open end 19 which is secured to the first mentioned side wall of the conduit section 9 by fastenings 20 and into which the ears 13 project. A rectangular open grill work vane 21 of smaller size than the cross sectional area of the conduit section 9 is disposed therein and has a rigid arm 22 projecting from one side thereof through the opening 12 and to adjacent the opposite, outer end of the casing 18 in which said arm is disposed. The vane 21 is swingably supported in the conduit section 9 by a pivot pin 23 which extends through the ears 13 and through said arm 22 and said vane is supported by said pivotal connection 23 so that the side thereof remote to the opening 12 is disposed for swinging movement between the upper and lower studs 17, as illustrated in full and dotted lines in Figure 1 whereby said studs limit the extent that the vane 21 swings downwardly and likewise limits its upward swinging movement to a position in substantially a horizontal plane or at a right angle to the axis of the conduit section 9. A counterbalance weight 24 is slidably mounted on the opposite end of the arm 22 and is provided with a setscrew 25 capable of being advanced into engagement with said arm 22 for retaining the counterbalance weight 24 in adjusted position thereon.

A hanger or bracket 26 which depends from the top wall of the casing 18 supports a pivot pin 27 which projects horizontally therefrom and which provides a support for pivotally mounting a platform 28 which is journaled on the pin 27 at a point spaced from the ends thereof. A pair of links 29 are pivotally connected at corresponding ends thereof at 30 to the end of the platform 28 which is remote to the conduit section 9 and said links 29 are pivotally connected at their opposite ends by a pivot 31 to the arm 22 within the casing 18 and between the pivot 23 and counterweight 24.

The platform 28 is provided with upwardly projecting pairs of spring clips 32 for detachably supporting a conventional mercury switch 33 therein above and substantially parallel to the platform 28. A pair of spaced electrical conductors 34 and 35 extend into one end of the tube of the mercury switch 33 and are normally disposed out of electrical contact with one another when said end of the tube is elevated. The opposite ends of the conductors 34 and 35 are connected to separate contact posts 36 and 37, respectively, which depend from a block of electrical insulating material 38 which is secured to the top wall of the casing 18 and disposed therein. An electrical conduit 39 extends inwardly through the outer end wall of the casing 18 and through a grommet 40 disposed in an opening thereof and contains two electrical conductors 41 and 42 which are connected respectively to the posts 36 and 37 and accordingly to the conductors 34 and 35, respectively. One of said last mentioned conductors, for example, the conductor 41 extends from a source of electric current, not shown, and the other conductor 42 leads to a conventional solenoid valve, not shown, or other electrically actuated means for shutting off a flow of water and which constitutes no part of the invention and it will be readily apparent that when the mercury switch 33 is disposed as seen in Figure 1 the mercury, not shown, which partially fills the tube of said switch will be out of contact with the conductors 34 and 35 so that the circuit between the conductors 41 and 42 will be broken. Thus, the aforementioned electric circuit is interrupted when the vane 21 is in its raised position of Figure 1 and said vane will assume this position when there is no flow by gravity from the grain spout section 6 through the conduit section 9 into the grain spout section 7 which latter section is adapted to discharge into a grain mill, not shown. Grain in passing through the conduit section 9 will pass around the vane 21 and also through the openings of the grill work thereof but the weight of the grain on the bar portions of said vane 21 will be sufficient to cause the vane to swing downwardly from its full line to its dotted line position of Figure 1 thereby elevating the end of the arm 21 disposed within the casing 18 to cause the platform 28 to be rocked counterclockwise on its pivot 27 through the linkage connection 29 of said platform with the arm 22 and in so moving the platform will be tilted in the opposite direction to its position of Figure 1 for similarly tilting the mercury switch 33 so that the mercury therein will come in contact with the ends of the conductors 34 and 35 disposed within the bulb of said switch for completing an electric circuit therebetween for thereby energizing the solenoid valve or other means, not shown connected to said circuit for permitting water to flow into the mill for raising the moisture content of the grain flowing thereto. When the flow of the grain ceases the counterweight 24 will cause the parts 21 and 22 to be swung clockwise on the pivot 23, as seen in Figure 1 to return the vane 21 to its full line position of Figure 1 and also for rocking the platform 28 clockwise and back to its position of Figure 1 so that the circuit through the mercury switch 33 will be broken.

Various modifications and changes are contemplated may obviously be resorted to, without departing from the spirit or scope of the invention as hereinafter defined by the appended claims.

We claim as our invention:

1. A flow responsive electric switch actuator comprising a conduit section adapted to be interposed in a gravity flow line for a finely divided material, a vane of grill work construction disposed in said conduit section and having an arm projecting therefrom and from said conduit section and pivotally connected to the latter for pivotally mounting the vane in the conduit section for swinging movement in a direction generally longitudinally thereof, said vane being only slightly smaller than the internal cross section of the conduit section, means carried by the arm and remote to said vane for normally supporting the latter substantially transversely of the conduit section, and linkage means adapted to connect the last mentioned end of said arm to a pivotally mounted electric circuit controlling switch whereby the switch will be rocked to a circuit closing position by a downward swinging movement of the vane responsive to the flow of a finely divided material through said conduit section and returned to the circuit interrupting position by the swinging movement of the vane and arm in the oppostie direction in response to the means carried by said arm and when the flow of said material through the conduit section is interrupted.

2. A structure as in claim 1, the grill work structure of said vane forming a plurality of bar portions defining a plurality of openings in said vane and through which a portion of the finely divided material is adapted to pass.

3. A flow responsive device as in claim 1, and a casing having an open end detachably connected to said conduit section and projecting laterally therefrom, said casing being disposed to receive the end of said arm disposed remote to the vane, and means forming a part of said casing and adapted to pivotally support said switch.

LON R. MOORE.
KEITH B. MITCHELL.

REFERENCES CITED

The following references are of record in the file of this patent:

UNITED STATES PATENTS

| Number | Name | Date |
| --- | --- | --- |
| 659,855 | Meloon | Oct. 16, 1900 |
| 2,013,225 | Waters | Sept. 3, 1935 |